US011339889B2

(12) United States Patent
Pengcheng et al.

(10) Patent No.: US 11,339,889 B2
(45) Date of Patent: May 24, 2022

(54) SOLENOID VALVE, FIXING ASSEMBLY FOR INSTALLING SENSOR, AND SENSOR ASSEMBLY

(71) Applicants: Tyco Electronics (Shanghai) Co. Ltd., Shanghai (CN); Measurement Specialties (Chengdu) Ltd., Chengdu (CN); Measurement Specialties (China) Ltd., Shenzhen (CN)

(72) Inventors: Sun Pengcheng, Shanghai (CN); Li Dongsheng, Shanghai (CN)

(73) Assignees: Tyco Electronics (Shanghai) Co. Ltd., Shanghai (CN); Measurement Specialties (Chengdu) Ltd., Chengdu (CN); Meacrement Specialties (China) Ltd., Shenzhen (CN)

( * ) Notice: Subject to any disclaimer, the term of this patent is extended or adjusted under 35 U.S.C. 154(b) by 101 days.

(21) Appl. No.: 16/995,177

(22) Filed: Aug. 17, 2020

(65) Prior Publication Data
US 2021/0048115 A1    Feb. 18, 2021

(30) Foreign Application Priority Data
Aug. 15, 2019  (CN) .......................... 201921327748.7

(51) Int. Cl.
| F16K 27/00 | (2006.01) |
| F16K 27/02 | (2006.01) |
| G01D 11/24 | (2006.01) |
| F01N 3/20 | (2006.01) |

(52) U.S. Cl.
CPC .......... F16K 27/029 (2013.01); G01D 11/245 (2013.01); *F01N 3/208* (2013.01); *F01N 2610/02* (2013.01); *F01N 2900/1811* (2013.01); *F01N 2900/1814* (2013.01); *F01N 2900/1818* (2013.01)

(58) Field of Classification Search
CPC ..... F16K 27/029; G01D 11/245; F01N 3/208; F01N 2610/02
See application file for complete search history.

(56) References Cited

U.S. PATENT DOCUMENTS

| 7,204,273 B1* | 4/2007 | Zub ..................... F15B 13/0814 |
| | | 137/884 |
| 11,215,097 B2* | 1/2022 | Schmidt ................ F01N 3/2896 |
| 2020/0263579 A1* | 8/2020 | Iida ........................ F01N 3/2066 |
| 2020/0370457 A1* | 11/2020 | Fellman ................ F01N 3/2066 |

* cited by examiner

*Primary Examiner* — Jamel E Williams
(74) *Attorney, Agent, or Firm* — Barley Snyder (57) ABSTRACT

A solenoid valve includes a valve body having a valve cavity, a first delivery tube having a first tube cavity, a second delivery tube having a second tube cavity, and an electromagnetic member connected to the valve body. The first delivery tube is connected to the valve body at one end and the first tube cavity is in communication with the valve cavity. The second delivery tube is connected to the valve body at one end and the second tube cavity is in communication with the valve cavity. At least one of the first delivery tube and the second delivery tube is a bent tube. The electromagnetic member is configured to control communication and disconnection of the first delivery tube and/or the second delivery tube with the valve cavity.

20 Claims, 7 Drawing Sheets

SOLENOID VALVE, FIXING ASSEMBLY FOR INSTALLING SENSOR, AND SENSOR ASSEMBLY

CROSS-REFERENCE TO RELATED APPLICATION

This application claims the benefit of the filing date under 35 U.S.C. § 119(a)-(d) of Chinese Patent Application No. 201921327748.7, filed on Aug. 15, 2019.

FIELD OF THE INVENTION

The present disclosure relates to a solenoid valve, a fixing assembly for installing a sensor, and a sensor assembly.

BACKGROUND

Urea for vehicles, for example, AdBlue, is a liquid used in selective catalytic reduction ("SCR") technology to reduce nitrogen oxide pollution in diesel exhaust. The quality of urea and the performance index during the use are related to the quality of exhaust gas. Therefore, vehicles are usually equipped with sensors for monitoring the status of urea, such as sensors for monitoring urea concentration, temperature, and liquid level, respectively.

During the use of the urea sensor, it is necessary to use a temperature-regulating liquid such as antifreeze or water to adjust its temperature, so as to avoid too high or too low temperature affecting the normal operation of the sensor. The supply of temperature-regulating liquid is controlled by a solenoid valve.

In one of the technical solutions, the solenoid valve and a sensor assembly are integrated into a non-detachable device. The production and installation of the non-detachable device, however, is inconvenient. Further, when some parts are damaged, the fault location cannot be accurately checked, leading to difficult maintenance, the need to replace the device as a whole, and increased costs. These disadvantages make the sensor assembly difficult to use.

SUMMARY

A solenoid valve includes a valve body having a valve cavity, a first delivery tube having a first tube cavity, a second delivery tube having a second tube cavity, and an electromagnetic member connected to the valve body. The first delivery tube is connected to the valve body at one end and the first tube cavity is in communication with the valve cavity. The second delivery tube is connected to the valve body at one end and the second tube cavity is in communication with the valve cavity. At least one of the first delivery tube and the second delivery tube is a bent tube. The electromagnetic member is configured to control communication and disconnection of the first delivery tube and/or the second delivery tube with the valve cavity.

BRIEF DESCRIPTION OF THE DRAWINGS

The invention will now be described by way of example with reference to the accompanying Figures, of which.

DETAILED DESCRIPTION OF THE EMBODIMENT(S)

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
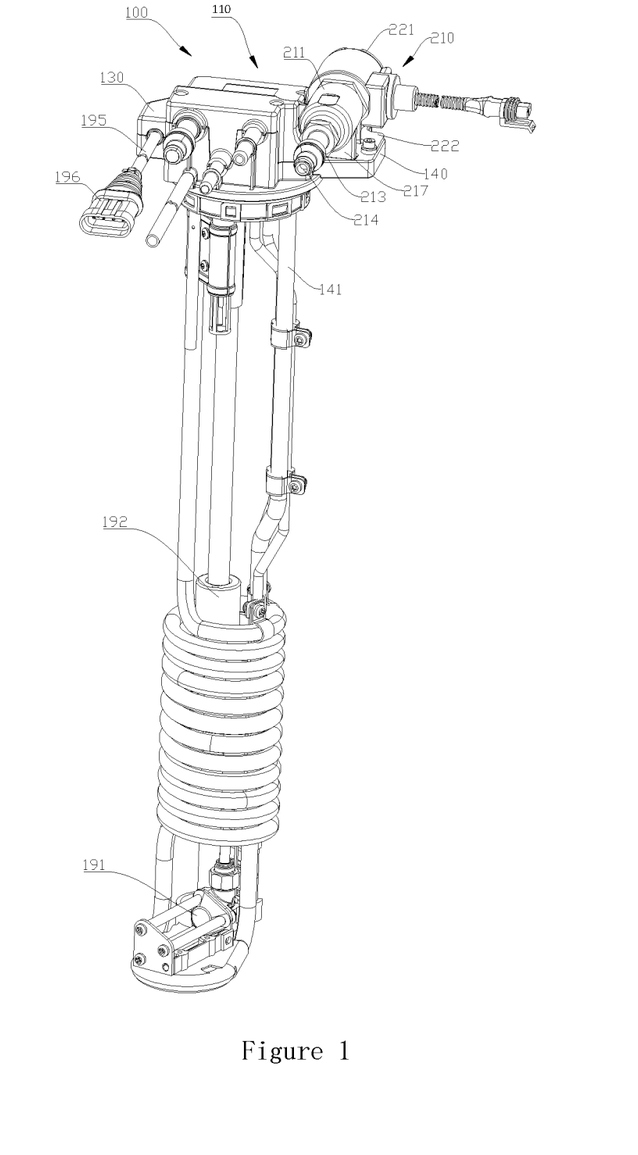
FIG. 1 is a perspective view of a sensor assembly according to an embodiment.

As shown in FIG. 1, a sensor assembly 100 according to an embodiment comprises a fixing assembly 110 for installing or mounting a sensor, and sensors 191, 192. The fixing assembly 110 comprises a housing 130, a fluid delivery line 141, and a solenoid valve 210. The housing 130 is used to install the fluid delivery line 141 and the solenoid valve 210.

As shown in FIGS. 1-3 and FIG. 11, the solenoid valve 210 comprises a valve body 211, a first delivery tube 212, a second delivery tube 213, an electromagnetic member 221, and a bracket 222. The valve body 211 is provided with a valve cavity 216. The first delivery tube 212 has a first tube cavity 215. The first delivery tube 212 is connected to the valve body 211 at one end, and the first tube cavity 215 is in communication with the valve cavity 216. The second delivery tube 213 has a second tube cavity 218. The second delivery tube 213 is connected to the valve body 211 at one end, and the second tube cavity 218 is in communication with the valve cavity 216. The first tube cavity 215 and the second tube cavity 218 communicate with each other through the valve cavity 216.

Figure 11:
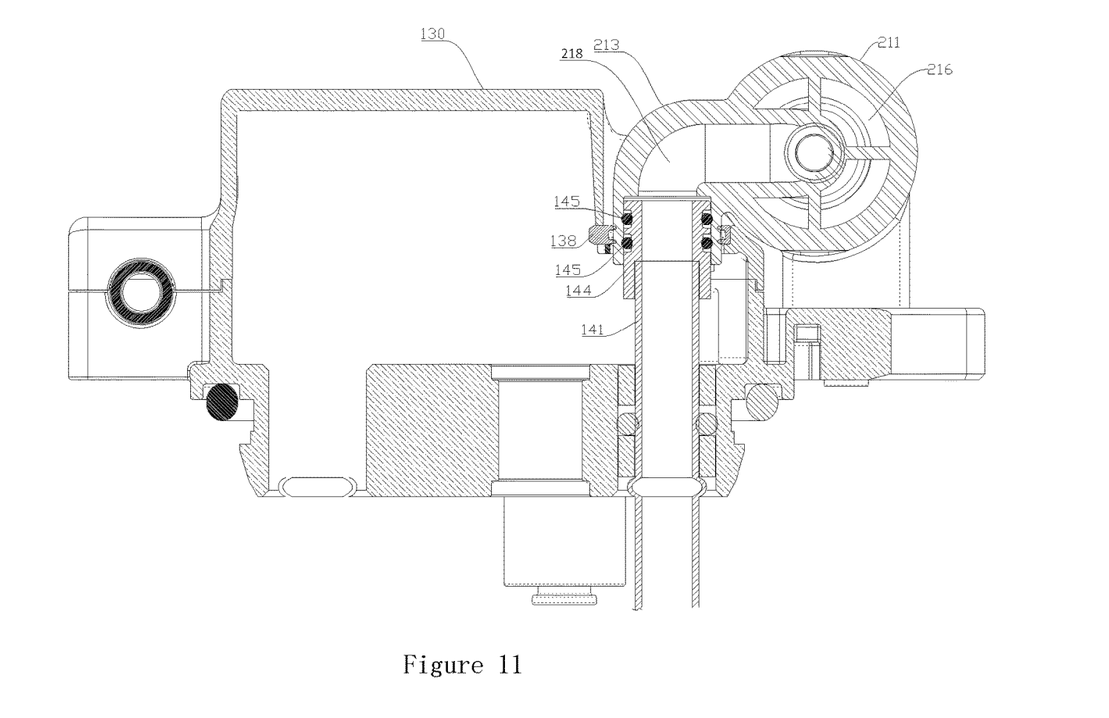
FIG. 11 is sectional top view of the second delivery tube, an adapter tube, a fluid delivery line, and a housing according to an embodiment.

One of the first delivery tube 212 and the second delivery tube 213 acts as an input tube to input fluid into the valve cavity 216 shown in FIG. 11, and the other acts as an output tube to output fluid in the valve cavity 216. In the following description, by way of example, the first delivery tube 212 acts as the input tube and the second delivery tube 213 acts as the output tube. At least one of the first delivery tube 212 and the second delivery tube 213 is a bent tube. In the example shown in FIGS. 1-3 and 11, the second delivery tube 213 is a bent tube. In an exemplary embodiment, the bent tube has a bending angle of 45°-135°. In the shown embodiment, the bending angle is 90°. In the following, the second delivery tube 213 refers to the bent tube. The second delivery tube 213 may be integrally formed with the valve body 211.

Figure 2:
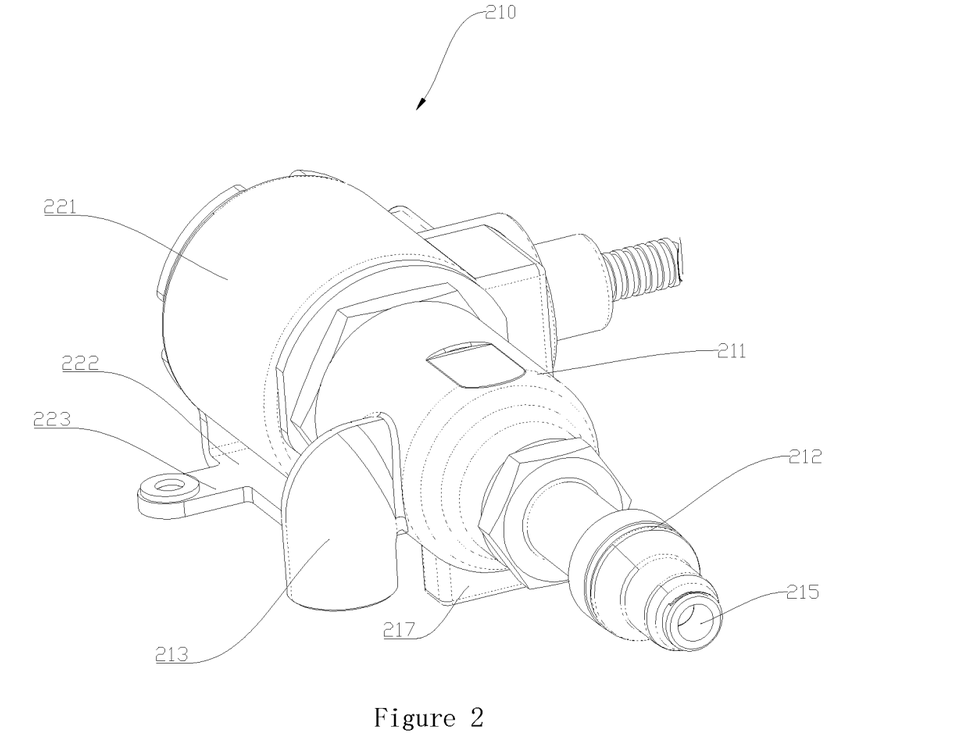
FIG. 2 is a perspective view of a solenoid valve according to an embodiment.
Figure 3:
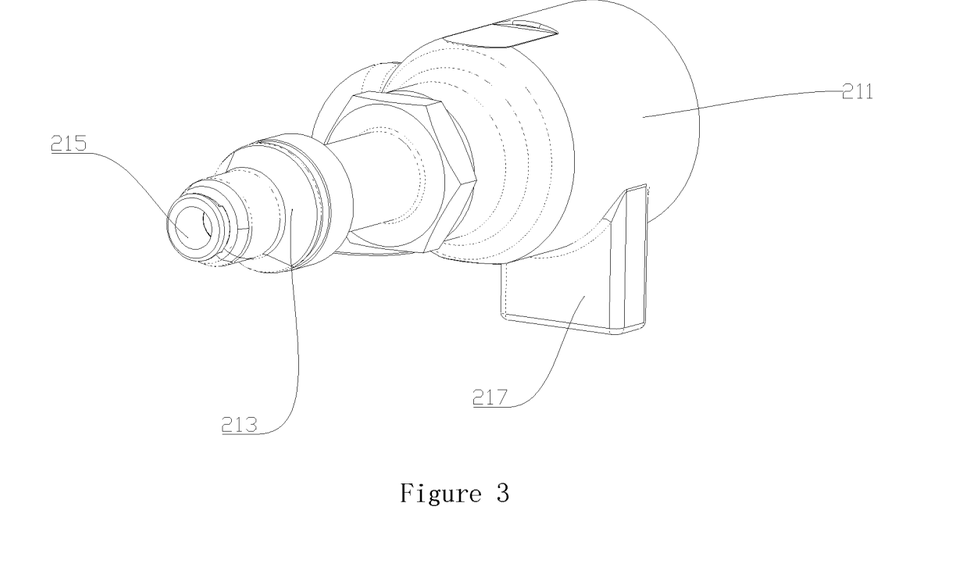
FIG. 3 is a perspective view of a valve body, a first delivery tube, and a second delivery tube according to an embodiment.

The valve body 211 is further provided with a positioning block 217, as shown in FIGS. 1-3, which is disposed on the valve body 211 and protrudes from the valve body 211.

The electromagnetic member 221, as shown in FIGS. 1-3 and 11, is connected to the valve body 211 and is used to control the communication and disconnection of the first delivery tube 212 and/or the second delivery tube 213 with the valve cavity 216. According to actual needs, the electromagnetic member 221 may control the opening and closing of the fluid delivery line 141 by only controlling the communication and disconnection of one of the first delivery tube 212 and the second delivery tube 213 with the valve cavity 216. This implementation may be determined according to the actual application. The structure and working principle of the electromagnetic member 221 are the same as those in the conventional technology and will not be repeatedly described here.

The electromagnetic member 221 is arranged on a bracket 222, as shown in FIGS. 1 and 2. The bracket 222 is provided with a plurality of connecting portions 223 for connecting the bracket 222 with other components.

As shown in FIGS. 4-8, the housing 130 is provided with a cavity 131 to accommodate other components, such as a signal processing circuit. According to the use requirements of the present disclosure, the housing 130 has an upper housing 132 and a lower housing 133, which are connected to form the housing 130 and enclose the cavity 131. In an embodiment, the upper housing 132 and the lower housing 133 are detachably connected with each other. In addition to the description of the present disclosure, the shapes and structures of the upper housing 132 and the lower housing 133 may be determined according to actual application. In the example shown in the figure, both the upper housing 132 and the lower housing 133 are in a substantially square shape.

Figure 7:
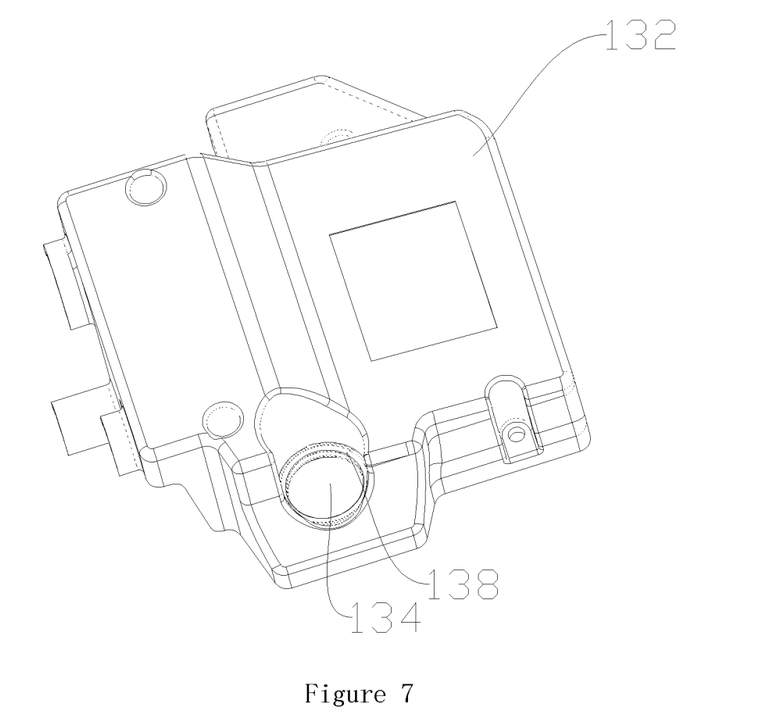
FIG. 7 is a perspective view of the upper housing and a second sealing member according to an embodiment.
Figure 8:
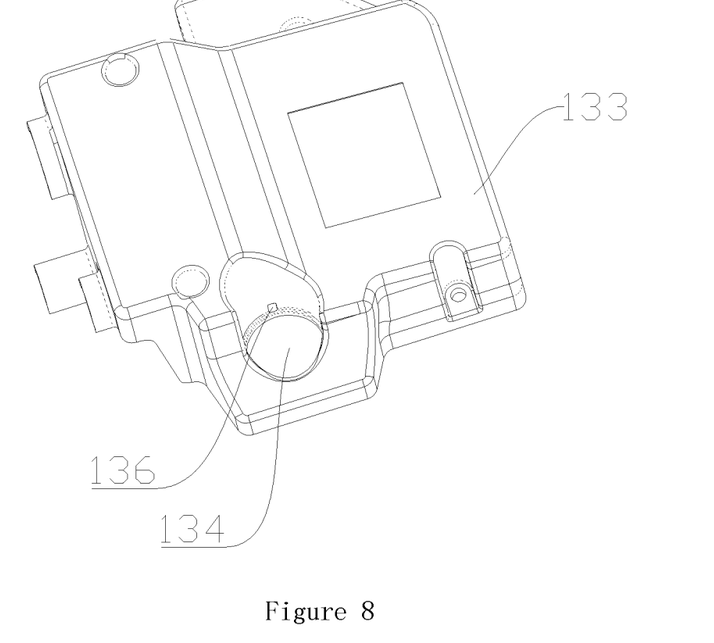
FIG. 8 is a perspective view of the upper housing.
Figure 9:
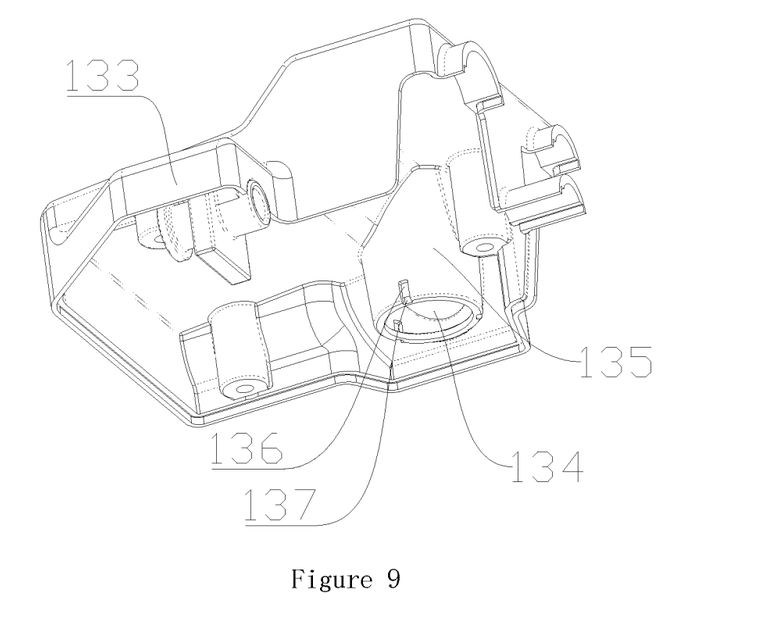
FIG. 9 is another perspective view of the upper housing.

The upper housing 132 is provided with a first through hole 134 that penetrates the upper housing 132 to connect the cavity 131 with the outside, as shown in FIGS. 7-9. The first through hole 134 is used for passing therethrough the fluid delivery line 141 as described later, and facilitates the connection of the fluid delivery line 141 and the second delivery tube 213 at the first through hole 134.

Figure 10:
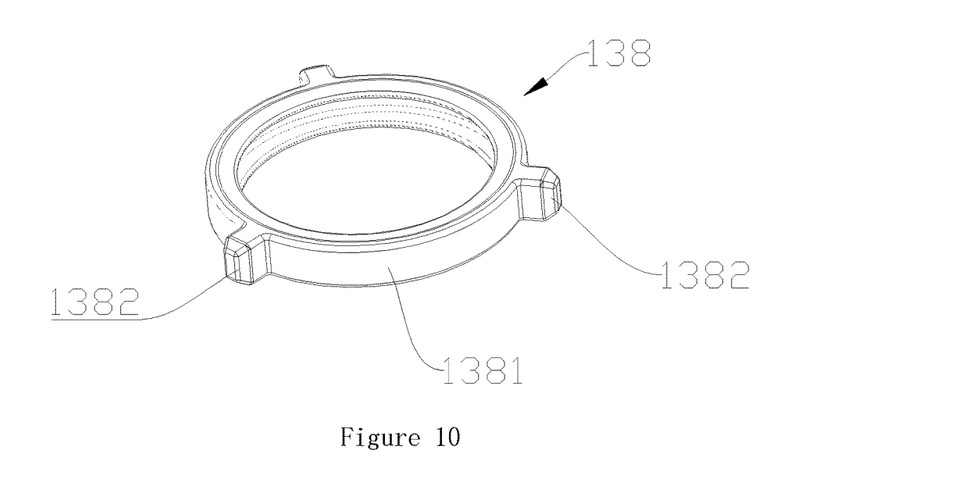
FIG. 10 is a perspective view of the second sealing member.

A second sealing member 138, as shown in FIGS. 7, 10, and 11, is further provided within the first through hole 134. In order to facilitate the installation of the second sealing member 138 in the first through hole 134, a hole wall of the first through hole 134 extends into the cavity 131 and has a section of suspended hole wall 135, as shown in FIG. 9.

As shown in FIG. 9, the suspended hole wall 135 is provided with a second through hole 136 that penetrates the suspended hole wall 135. In the circumferential direction, the number of the second through holes 136 is plural, and the specific number is the same as the number of snap protrusions 1382 described later. A groove 137 is provided on the outer surface of the suspended hole wall 135. The groove 137 extends from an end portion of the suspended hole wall 135 to the first through hole 134 and communicates with the first through hole 134. In an embodiment, each first through hole 134 is provided with one groove 137.

As shown in FIGS. 7-10, the second sealing member 138 is provided in the second through hole 136 to seal a gap between the hole wall 135 of the first through hole 134 and the second delivery tube 213. In the examples shown in the figures, the second sealing member 138 comprises an annular body 1381 and a snap protrusion 1382. The annular body 1381 is used for sealing, and the snap protrusion 1382 is used to fix the annular body 1381 in the first through hole 134. According to the examples shown in the figures, the snap protrusion 1382 is connected to the annular body 1381 and protrudes from the annular body 1381. The number of the snap protrusions 1382 is more than one, and the specific number is the same as the number of the second through holes 136.

The snap protrusions 1382 are embedded in the second through hole 136 to fix the annular body 1381 at a desired position in the first through hole 134. The snap protrusion 1382 can be pushed through the groove 137 to exit the second through hole 136, so as to disassemble the second sealing member 138. The second through hole 136 is only used as an example of the receiving structure, and may also be replaced by a groove, a receiving slot, or a blind hole.

Figure 5:
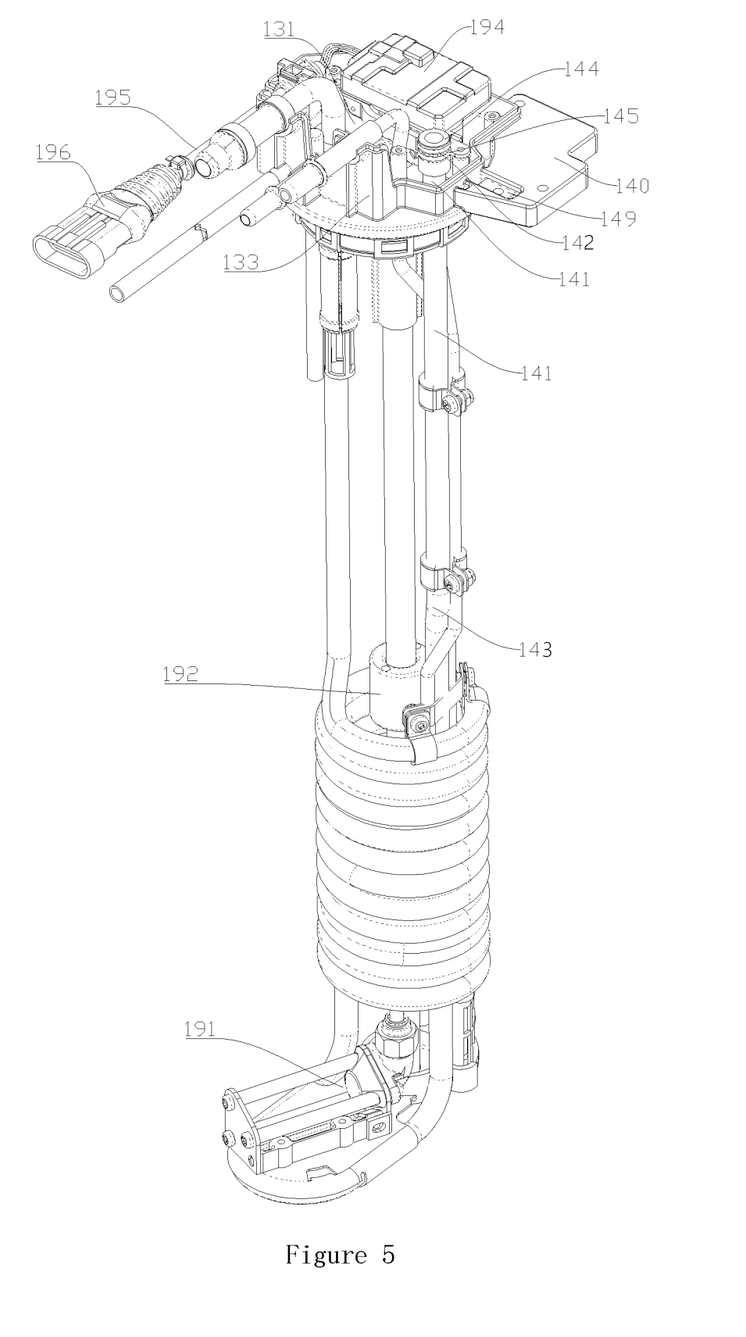
FIG. 5 is a perspective view of the fixing assembly without an upper housing.
Figure 6:
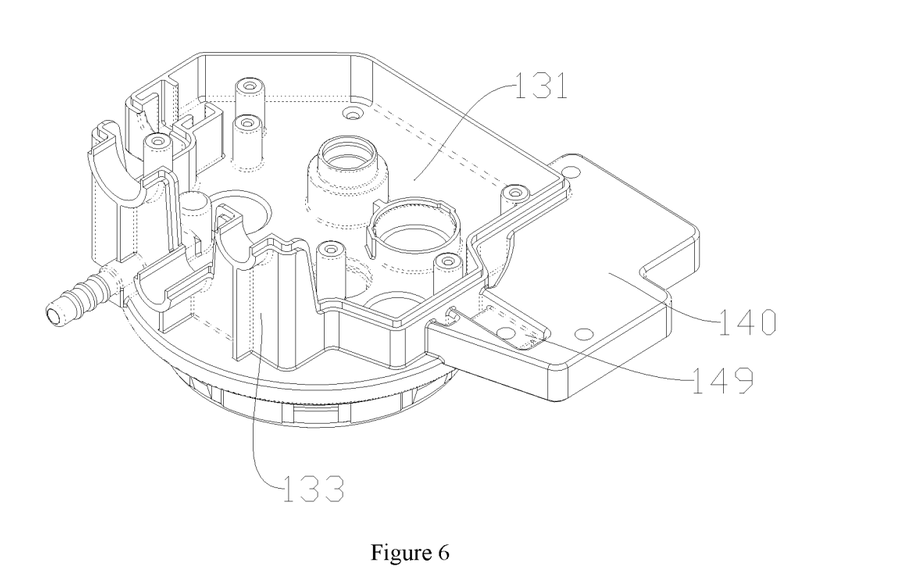
FIG. 6 is a perspective view of a lower housing according to an embodiment.

The lower housing 133 is provided with a connecting structure configured to be connected to the solenoid valve 210 so that the solenoid valve 210 and the lower housing 133 are integrally connected together. In this embodiment as shown in FIG. 5, the connecting structure is a support platform 140 configured to be connected to the lower housing 133. The support platform 140 is used to support the solenoid valve 210, as shown in FIG. 1, and its structural form may be determined according to the occasion of use. In the example as shown in the figure, the support platform 140 extends from the lower housing 133 and protrudes from the lower housing 133. In an embodiment, the lower housing 133 and the support platform 140 are integrally formed. The support platform 140 is provided with a receiving slot 149 for receiving a part of the positioning block 217. According to actual needs, the support platform 140 may also be connected to the upper housing 132.

The fluid delivery line 141 is used to deliver a temperature-regulating fluid, such as water or antifreeze. One end 142 of the fluid delivery line 141 passes through the lower housing 133 and the cavity 131 and extends out from the first through hole 134 of the upper housing 132, as shown in FIG. 5. The other end 143 of the fluid delivery line 141 passes through the lower housing 133, the cavity 131 and the upper housing 132 and extends out for connection.

An adapter tube 144 is connected to the end 142 of the fluid delivery line 141, as shown in FIG. 5. The adapter tube 144 has a size adapted to the size of the second delivery tube 213, and is used to connect the fluid delivery line 141 and the second delivery tube 213. The adapter tube 144 has an outer diameter larger than the outer diameter of one end of the fluid delivery line 141, so as to facilitate connection with the second delivery tube 213. As shown in FIG. 11, the second delivery tube 213 is sleeved on or fits over the adapter tube 144, and the adapter tube 144 is inserted into the second tube cavity 218 of the second delivery tube 213.

As shown in FIG. 11, the outer wall of the adapter tube 144 is covered with a first sealing member to seal the gap between the adapter tube 144 and the second delivery tube. In an embodiment, the first sealing member is an O-ring 145. Two O-rings 145 are arranged at intervals. When the second delivery tube 213 is sleeved outside or fits over the adapter tube 144, the O-ring 145 is squeezed to deform. Then, the O-ring 145 seals the gap between the adapter tube 144 and the second delivery tube 213.

Figure 4:
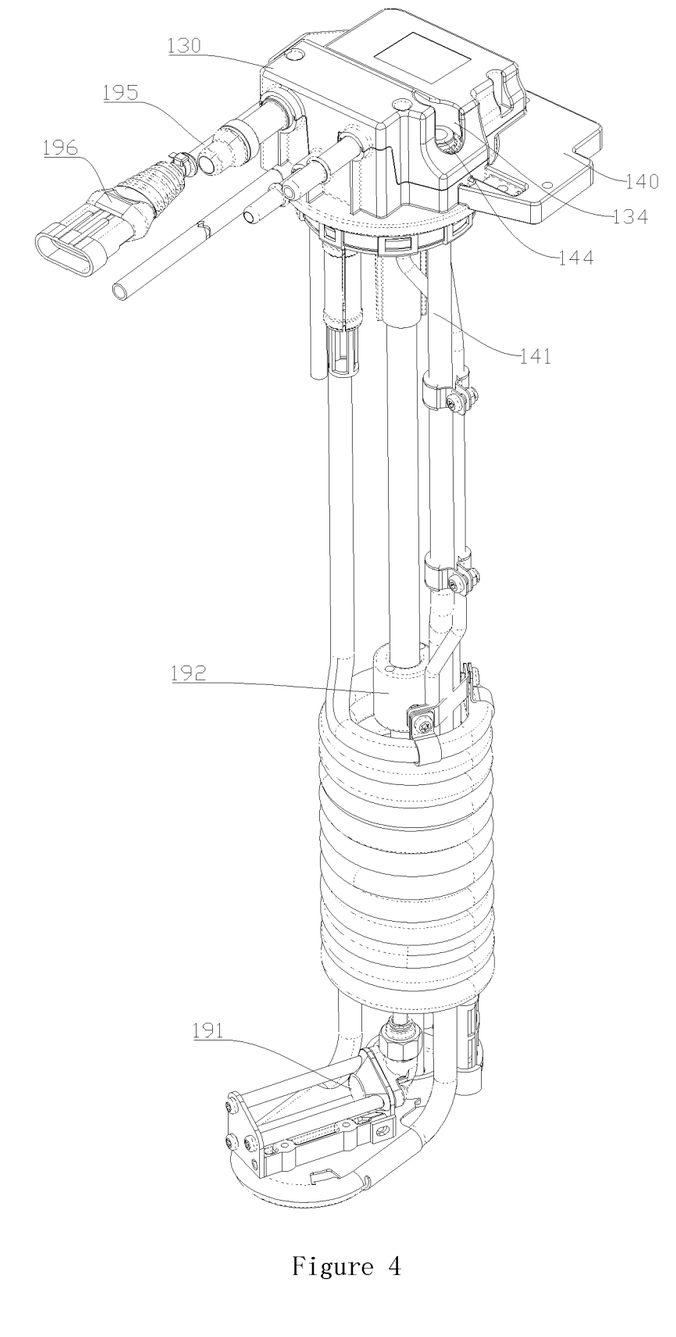
FIG. 4 is a perspective view of a fixing assembly for installing a sensor and the sensor according to an embodiment.

The solenoid valve 210 is arranged on the support platform 140, and the positioning block 217 is partially embedded in the receiving slot 149, as shown in FIGS. 1 and 4. The connecting portions 223 of the bracket 222 and the support platform 140 are connected by fasteners. Some fasteners pass through the support platform 140 to connect the positioning block 217. The second delivery tube 213 is inserted into the first through hole 134 and sleeved on the adapter tube 144. The O-ring 145 seals the gap between the second delivery tube 213 and the adapter tube 144, and the annular body 1381 of the second sealing member 138 seals the gap between the second delivery tube 213 and the upper housing 132.

The type of the sensor in the present disclosure may be determined according to the needs of actual use. For example, when it serves as a vehicle urea quality sensor, a urea concentration sensor 191 and a liquid level sensor 192 may be used. A temperature sensor (not shown in the figure) may also be provided at a suitable position. A signal processing circuit is provided in the cavity 131 to process the electrical signal delivered by the sensor and transmit it to the outside, or directly transmit the electrical signal without processing. The signal processing circuit may be set according to actual needs. For example, it may be set as a printed circuit board 194 electrically connected to other components using wires 195 and connectors 196, as shown in FIG. 5.

According to the solenoid valve 210, the fixing assembly 110 for installing a sensor, and the sensor assembly 100 described in the present disclosure, the solenoid valve 210 and the fixing assembly 110 are sleeved and detachably connected with a third tube cavity of the fluid delivery line 141 through the first delivery tube 212 or the second delivery tube 213. Thereby, the production and installation are convenient, the fault location can be accurately checked, the replacement and maintenance are convenient, and the use is also convenient.

The housing 130 is provided with the support platform 140, which may conveniently connect and assemble the solenoid valve 210 and the housing 130. The adapter tube 144 is provided on the fluid delivery line 141 to facilitate the sleeving and connection of the fluid delivery line 141 to the first delivery tube 212 or the second delivery tube 213, so as to avoid that too large difference in their diameters otherwise causes installation failure. The first sealing member 145 and the second sealing member 138 are provided to seal the gap between the first delivery tube 212 or the second delivery tube 213 and the fluid delivery line 141 and the housing 130, so as to prevent leakage and prevent the devices in the cavity 131 in the housing 130 from being affected by moisture.

The second sealing member 138 is annular and is provided with a protrusion 1382 for latching, which is convenient for installation and disassembly. The first through hole 134 is provided with a section of suspended tube wall 135, which is convenient to provide a receiving structure for embedding the second sealing member 138. The outer surface of the suspended hole wall 135 is provided with a groove 137, which may be convenient for pushing the protrusion 1382 to disassemble the second sealing member 138. The first delivery tube 212 or the second delivery tube 213 at the connection adopts a bent tube, which is convenient for connecting and assembling with the fluid delivery line 141 on the fixing assembly 110 for installing the sensor. The support platform 140 is provided with a receiving groove 149 to receive a part of the positioning block 217, which may ensure the stability of the valve body 211 during use and the safety of use.

The above are only embodiments of the present disclosure and are not intended to limit the scope of protection of the present disclosure. Any modifications, equivalent substitutions or improvements made within the spirit of the present disclosure are covered by the scope of the claims of the present disclosure.

What is claimed is:

1. A solenoid valve, comprising:
   a valve body having a valve cavity;
   a first delivery tube having a first tube cavity, the first delivery tube connected to the valve body at one end, the first tube cavity in communication with the valve cavity;
   a second delivery tube having a second tube cavity, the second delivery tube connected to the valve body at one end, the second tube cavity in communication with the valve cavity, at least one of the first delivery tube and the second delivery tube is a bent tube; and
   an electromagnetic member connected to the valve body and configured to control communication and disconnection of the first delivery tube and/or the second delivery tube with the valve cavity.

2. The solenoid valve of claim 1, wherein the bent tube has a bending angle of 45°-135°.

3. The solenoid valve of claim 1, wherein the first delivery tube is an input tube for delivering a fluid into the valve cavity, the second delivery tube is an output tube for outputting fluid in the valve cavity, and the second delivery tube is the bent tube.

4. The solenoid valve of claim 1, further comprising at least one of:
   a positioning block arranged on the valve body and protruding from the valve body; and
   a bracket on which the electromagnetic member is arranged, the bracket having a connecting portion for connecting the bracket with other components.

5. A fixing assembly for installing a sensor, comprising:
   a housing sealedly fixing a fluid delivery line; and
   a connecting structure fixing and connecting a solenoid valve to integrate the solenoid valve on the housing.

6. The fixing assembly of claim 5, wherein the solenoid valve includes a first delivery tube having a first tube cavity and a second delivery tube having a second tube cavity, the fluid delivery line has a third tube cavity, at least one of the first delivery tube and the second delivery tube is a bent tube connected to the fluid delivery line and the first tube cavity or the second tube cavity is in direct communication with the third tube cavity.

7. The fixing assembly of claim 6, wherein the housing has a first through hole, at least one end of the fluid delivery line penetrates the housing and extends out from the first through hole, the bent tube is in communication with the fluid delivery line.

8. The fixing assembly of claim 7, wherein the fluid delivery line is sleeved on the bent tube and a first sealing member is provided between the fluid delivery line and the bent tube to seal a gap therebetween.

9. The fixing assembly of claim 8, wherein an adapter tube is provided at an end portion of the fluid delivery line, the adapter tube having a size adapted to a size of the bent tube, the fluid delivery line is connected to the bent tube through the adapter tube and the first sealing member is arranged between the adapter tube and the bent tube.

10. The fixing assembly of claim 6, wherein the housing has a first through hole, a second sealing member is provided in the first through hole to seal a gap between the housing and the bent tube of the solenoid valve inserted in the first through hole.

11. The fixing assembly of claim 10, wherein the second sealing member includes an annular body and a plurality of snap protrusions connected to the annular body and protruding from the annular body, the first through hole is provided with a receiving structure, the annular body is located in the first through hole and the snap protrusions are embedded in the receiving structure.

12. The fixing assembly of claim 11, wherein the first through hole has a continuously extending and suspended hole wall, the receiving structure is arranged on the suspended hole wall, and the receiving structure is the second through hole that penetrates the suspended hole wall.

13. The fixing assembly of claim 12, wherein an outer surface of the suspended hole wall has a groove extending from an end portion of the suspended hole wall to the second through hole.

14. The fixing assembly of claim 5, wherein the connecting structure is a support platform on which the solenoid valve is installed and the solenoid valve is connected to the housing through the support platform, the solenoid valve includes:
 a valve body having a valve cavity;
 a first delivery tube having a first tube cavity, the first delivery tube connected to the valve body at one end, the first tube cavity in communication with the valve cavity;
 a second delivery tube having a second tube cavity, the second delivery tube connected to the valve body at one end, the second tube cavity in communication with the valve cavity, at least one of the first delivery tube and the second delivery tube is a bent tube; and
 an electromagnetic member connected to the valve body and configured to control communication and disconnection of the first delivery tube and/or the second delivery tube with the valve cavity.

15. The fixing assembly of claim 14, wherein the support platform extends from the housing and protrudes from the housing, or the housing and the support platform are integrally formed.

16. The fixing assembly of claim 14, wherein the solenoid valve has a bracket connected to the support platform, or the support platform has a receiving slot for receiving a part of a positioning block of the solenoid valve.

17. The fixing assembly of claim 16, wherein the solenoid valve is detachably connected to the support platform through a plurality of fasteners, and at some of the fasteners pass through the support platform to be connected to the positioning block.

18. The fixing assembly of claim 5, wherein the fixing assembly is a fixing assembly of a vehicle urea sensor assembly for installing a sensor.

19. A sensor assembly, comprising:
 a solenoid valve including:
  a valve body having a valve cavity;
  a first delivery tube having a first tube cavity, the first delivery tube connected to the valve body at one end, the first tube cavity in communication with the valve cavity;
  a second delivery tube having a second tube cavity, the second delivery tube connected to the valve body at one end, the second tube cavity in communication with the valve cavity, at least one of the first delivery tube and the second delivery tube is a bent tube; and
  an electromagnetic member connected to the valve body and configured to control communication and disconnection of the first delivery tube and/or the second delivery tube with the valve cavity; and
 a fixing assembly for installing a sensor, the fixing assembly including a housing configured to sealedly fix a fluid delivery line and a connecting structure configured to fix and connect the solenoid value to integrate the solenoid valve on the housing.

20. The sensor assembly of claim 19, further comprising:
 a sensor for monitoring and outputting an electrical signal, the sensor mechanically connected to the housing; and
 a signal processing circuit disposed in a fixed device, the sensor electrically connected to the signal processing circuit.

* * * * *